March 10, 1953 M. H. L. SÉDILLE 2,630,679
COMBUSTION CHAMBERS FOR GAS TURBINES WITH DIVERSE
COMBUSTION AND DILUENT AIR PATHS
Filed Jan. 27, 1948

INVENTOR
M. H. L. Sédille

By Watson, Cole, Grindle & Watson

Patented Mar. 10, 1953

2,630,679

UNITED STATES PATENT OFFICE 2,630,679

COMBUSTION CHAMBERS FOR GAS TURBINES WITH DIVERSE COMBUSTION AND DILUENT AIR PATHS

Marcel H. L. Sédille, Paris, France, assignor to Societe Rateau (Société Anonyme), Paris, France, a company of France, and René Anxionnaz, Paris, France Application January 27, 1948, Serial No. 4,483
In France February 27, 1947

6 Claims. (Cl. 60—39.65)

The combustion chambers of turbo-reactors receive as well known in the art a considerable incorporation of compresed air that mixes with the gases produced by the combustion of the fuel and said mixture forms the driving fluid for the gas turbines.

It is an object of my invention to provide improved means for mixing the said fluid, to wit the compressed air and exhaust gases, said means being of particular interest for combustion chambers operating on return or reversed flow.

According to said improvement and starting with the mixture passing out of the combustion chamber towards the turbine and formed by the combustion of fuel in the primary air entering said combustion chamber close to the injection point for the fuel, there is incorporated into said mixture through a special distributor a further addition of compressed air passing directly out of the compressor and forming the secondary air.

For a proper operation of the system, it is essential to balance static pressures at the point at which said addition of secondary air is made.

Supposing $p$ designates the static pressure at the point considered and $P$ the total pressure at the output of the compressor while $V_1$ and $V_2$ are respectively the speeds of secondary air and gas at the point at which the admixture is made while furthermore $W_1$ and $W_2$ are the corresponding specific weights and $\Delta p_1$, $\Delta p_2$ the losses of pressure on the one hand in the secondary air circuit and on the other hand in the primary air and gas circuit, the following relationship should be satisfied.

$$P-p = W_1 V_1^2/2g + \Delta p_1 = W_2 V_2^2/2g + \Delta p_2$$

It is immediately apparent that according as to whether the two losses of head $\Delta p_1$ or $\Delta p_2$ are equal or either of same predominates, it is necessary to resort to equal or different speeds $V_1$ and $V_2$ for the secondary air and gases in order to obtain the desired equilibrium of static pressures at the point where the secondary air is admixed with the hot gases flowing from the combustion chamber.

One of the arrangements forming the object of the invention allows of traducing to a maximum the loss of pressure $\Delta p_1$ of the air circuit and consequently of increasing the speed $V_1$ for the air at the point of admixture that leads to:

1.—A reduction in the cross-section of the air mixer and consequently a reduction in the size of the system of combustion chambers at said point.

2.—An increase in the mean kinetic energy of the jet of mixed gases at the input into the turbine, which forms a direct and important beneficial effect.

It is also possible in this way to obviate a supplementary compressor operating only on the primary air, as described in the British specification No. 585,763.

This reduction in the loss of head of the secondary air circuit may be obtained in the following manner:

In the chambers of the reverse flow type, a certain fraction of the loss of head of the primary air and gas circuit corresponds to the changes in the direction of the fluid, which are necessary with this kind of chambers. Similar changes in direction are however not necessary for the secondary mixing air and in the arrangement according to the invention the path of the corresponding flux is as direct as possible.

It is consequently necessary to provide means whereby in spite of the small distance remaining between the mixer and the input into the turbine, the mixture may however be homogeneous. These means consist chiefly in fractionating the air used for the mixture into thin jets the length of which is as small as possible and the number of which is as high as possible.

The length of the mixing zone may thereby be reduced to the minimum possible amount and it is consequently possible to considerably reduce the distance between the output of the compressor and the input into the turbine, which is of advantage for the construction of the movable part and the total weight of the machine.

The following description and accompanying drawings given out by way of example and by no means in a binding sense will allow a proper understanding of the invention and the features appearing both in the specification and in the drawings form of course part of the invention. In said drawings.

Figure 1:
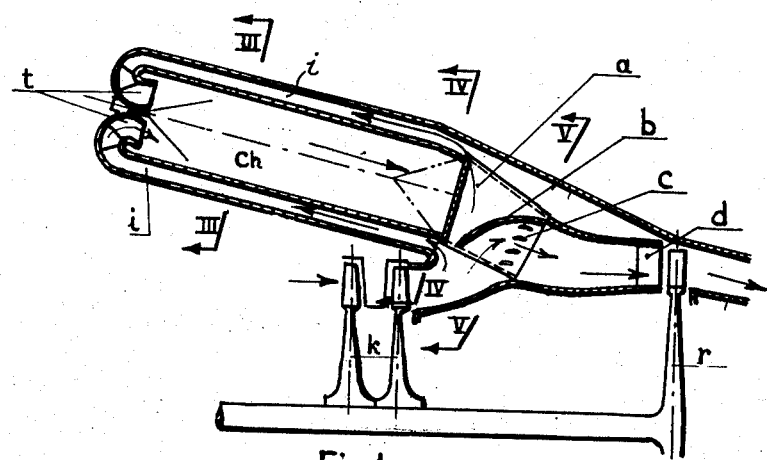
Fig. 1 is a longitudinal partial cross-section of a gas turbine including an improved combustion chamber according to the invention.
Figure 2:
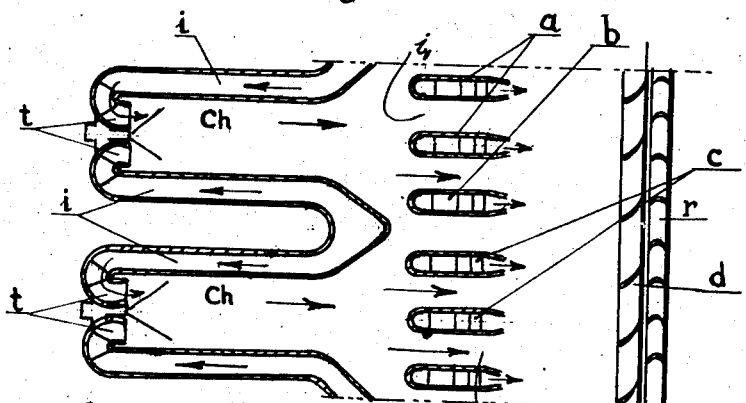
Fig. 2 is a developed cross-section through a cone having for its axis the axis of the power unit and it shows in particular the connection between two adjacent combustion chambers arranged drumwise coaxially round the axis of the turbine.
Figure 3:
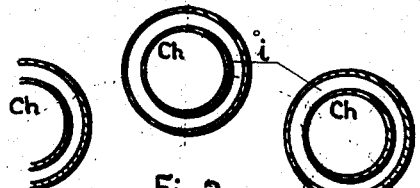
Figs. 3, 4 and 5 are transversal cross-sections respectively through lines III—III, IV—IV and V—V of Fig. 1. These cross-sections show the different successive cross-sections of the combustion chambers and of the passages afforded for the primary and secondary air flows.
Figure 4:
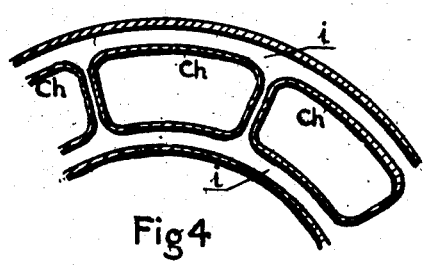

Fig. 1 shows a combustion chamber of the reverse flow type with an injection of fuel to the front thereof; part of the air delivered by the compressor $k$ rises towards the nose of the chamber through the annular space $i$ formed between the outer casing and the inner liner or flame jacket of the combustion chamber and said compressed air enters the inside of the chamber through openings provided in said jacket and through the nozzles $t$ located in register with the fuel injector. This air forms the primary air flow.

Figure 5:
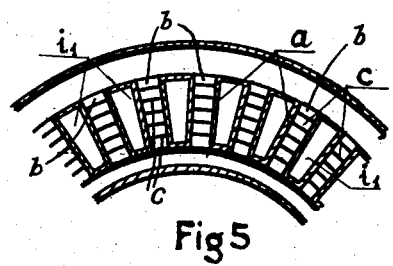

The secondary air passes through the right hand side of the distributors $a$ that assume the shape of flat boxes open at the top and bottom and also open through their side directed towards the turbine $r$. The secondary air from the compressor $k$ is deflected towards the turbine $r$ by the partition $b$ while the fraction of said air passing above and on the left hand side of said partition is admixed with the primary air current flowing through the annular space $i$. The secondary air collected and deflected by the partition $b$ is caused to flow in the direction desired for its flow by means of suitably shaped blades $c$ located inside the boxes $a$. At the output end of said blades and of the distributor boxes $a$, the secondary air mixes with the flow of gases produced by the combustion of fuel inside the primary air and directed towards the turbine through the intervals $i_1$ (Fig. 5) separating the different distributor boxes $a$. The secondary air mixes with said primary flow in the space separating the output of the distributor boxes $a$ from the nozzles $d$ providing admission to the turbine.

What I claim is:

1. In a gas turbine plant, a gas turbine, an air compresor, the air outlet of which faces the gas inlet of said turbine, means forming a direct air passage without substantial change of direction between said air outlet and said gas inlet, a combustion chamber of the reverse flow type arranged outside said passage, said combustion chamber including an outer casing and an inner flame jacket providing between them an annular air-combustion channel, the annular air inlet opening of which as well as the gas outlet opening of said flame jacket face the gas inlet of said turbine, said annular air inlet opening being connected directly to the air outlet of said compressor so as to be fed with air at the pressure delivered by said compressor, and a duct extending from the outlet opening of said flame jacket to the gas inlet of said turbine, for delivering combustion gas thereto, said direct air passage forming means including at least one nozzle having its inlet opening in direct communication with the outlet of said compressor, while its exit opening is located in said duct downstream with respect to the gas outlet opening of said flame jacket and faces the gas inlet of the turbine, so as to deliver air from said compressor inside the flow of combustion gas, as a thin jet having a great velocity directed towards the gas inlet of the turbine.

2. The combination of claim 1 wherein the gas turbine and the air compressor being coaxially arranged, said nozzle has a flat shape and is arranged inside said duct substantially in a plane passing through the common axis of both the turbine and the compressor.

3. The combination of claim 1 wherein said nozzle has a flat shape and is provided with blades dividing the air flow into several thin jets.

4. In a gas turbine plant, a gas turbine, an air compressor coaxially arranged with respect to said turbine and the air outlet of which faces the gas inlet of said turbine, a combustion chamber of the reverse flow type including an outer casing and an inner flame jacket providing between them an annular combustion air channel, the annular air inlet opening of which as well as the gas outlet opening of said flame jacket face the gas inlet of said turbine, said air inlet opening being connected directly to the air outlet of said compressor so as to be fed with air at the pressure delivered by said compressor, a combustion gas pipe having in its wall facing the air outlet of said compressor a narrow, side aperture arranged lengthwise, said pipe extending from the outlet opening of said flame jacket to the gas inlet of said turbine, a secondary air nozzle arranged inside said pipe and around said aperture through which said nozzle is fed directly with air from said compressor, said nozzle having a flat shape of cross-section area smaller than that of said pipe and being arranged substantially in a plane passing through the common axis of the turbine and of the compressor, said nozzle having its exit opening located in said pipe downstream with respect to the gas outlet opening of said flame jacket and facing the gas inlet of the turbine so as to deliver secondary air inside the combustion gases flowing through said duct, as a thin flat jet parallel to the flow of combustion gases and directed towards the gas inlet of the turbine.

5. In a gas turbine plant, a gas turbine provided with a gas inlet, an air compressor having an air outlet facing the inlet of said turbine and a combustion chamber of the reverse flow type including an outer casing and an inner flame jacket providing between them an annular combustion air channel, the annular air inlet opening of which as well as the gas outlet opening of said flame jacket face the gas inlet of said turbine, said air inlet opening being connected directly to the air outlet of said compressor so as to be fed with air at the pressure delivered by said compressor, a duct annularly shaped extending from the gas outlet opening of said flame jacket to the gas inlet of said turbine, for delivering combustion gas thereto, and a plurality of secondary air distributing nozzles arranged at spaced apart points in ring formation inside said annular duct and connected through the wall of said duct to the air outlet of said air compressor so as to be fed with air therefrom, said nozzles having their exit aperture located in said duct downstream with respect to the gas outlet opening of said flame jacket and facing said turbine gas inlet.

6. The combination of claim 5 wherein each of said secondary air distributing nozzles has the shape of a flat box radially arranged in said duct and provided with an exit aperture of oblong shape facing said gas inlet.

MARCEL H. L. SÉDILLE.

(References on following page)

REFERENCES CITED

The following references are of record in the file of this patent:

UNITED STATES PATENTS

| Number | Name | Date |
|---|---|---|
| 2,256,198 | Hahn | Sept. 16, 1941 |
| 2,326,072 | Seippel | Aug. 3, 1943 |
| 2,399,046 | Larrecq | Apr. 23, 1946 |
| 2,414,551 | Pavlecka et al. | Jan. 21, 1947 |
| 2,438,247 | Knudsen | Mar. 23, 1948 |
| 2,482,394 | Wyman | Sept. 20, 1949 |
| 2,510,645 | McMahan | June 6, 1950 |
| 2,546,432 | Darling | Mar. 27, 1951 |
| 2,549,858 | Sforzini | Apr. 24, 1951 |
| 2,573,694 | DeZubay | Nov. 6, 1951 |

FOREIGN PATENTS

| Number | Country | Date |
|---|---|---|
| 585,763 | Great Britain | Feb. 24, 1947 |